(12) United States Patent
Arnold

(10) Patent No.: US 10,127,828 B2
(45) Date of Patent: Nov. 13, 2018

(54) RUNNING FORM AID SYSTEM

(71) Applicant: F.A.S.T. Mechanics, LLC, Fargo, ND (US)

(72) Inventor: Micah J. Arnold, Fargo, ND (US)

(73) Assignee: F.A.S.T. Mechanics, LLC, Fargo, ND (US)

( * ) Notice: Subject to any disclaimer, the term of this patent is extended or adjusted under 35 U.S.C. 154(b) by 391 days.

(21) Appl. No.: 14/943,700

(22) Filed: Nov. 17, 2015

(65) Prior Publication Data

US 2017/0140664 A1 May 18, 2017

(51) Int. Cl.
*G09B 19/00* (2006.01)
*A63B 21/00* (2006.01)
*A63B 21/055* (2006.01)

(52) U.S. Cl.
CPC ...... *G09B 19/0038* (2013.01); *A63B 21/0552* (2013.01); *A63B 21/4009* (2015.10); *A63B 21/4015* (2015.10); *A63B 21/4019* (2015.10)

(58) Field of Classification Search
None
See application file for complete search history.

(56) References Cited

U.S. PATENT DOCUMENTS

| | | | | |
|---|---|---|---|---|
| 5,372,565 A | * | 12/1994 | Burdenko | A63B 21/0552 482/124 |
| 5,518,480 A | * | 5/1996 | Frappier | A63B 21/0004 482/124 |
| 5,683,336 A | | 11/1997 | Pape | |
| 5,813,955 A | * | 9/1998 | Gutkowski | A63B 21/0004 482/121 |
| 6,361,517 B1 | | 3/2002 | Slinger | |
| 6,551,221 B1 | * | 4/2003 | Marco | A63B 21/0004 280/600 |
| 7,147,590 B2 | | 12/2006 | Toren | |
| 7,261,679 B2 | | 8/2007 | Sload | |
| 7,314,437 B2 | | 1/2008 | Frappier | |
| 7,491,186 B2 | | 2/2009 | Zeide | |
| 7,998,034 B1 | | 8/2011 | Cobo | |
| 2002/0068667 A1 | * | 6/2002 | Strachan | A63B 21/0004 482/124 |
| 2003/0040408 A1 | | 2/2003 | Cooper, Sr. | |
| 2005/0107222 A1 | * | 5/2005 | Toven | A63B 69/0028 482/74 |
| 2008/0194390 A1 | | 8/2008 | Todd | |
| 2011/0111930 A1 | | 5/2011 | Byrd | |
| 2013/0143723 A1 | * | 6/2013 | Bender | A63B 21/0552 482/121 |

(Continued)

*Primary Examiner* — Bruk Gebremichael
(74) *Attorney, Agent, or Firm* — Neustel Law Offices

(57) ABSTRACT

A running form aid system for efficiently teaching a runner the proper running form. The running form aid system generally includes a waist belt attachable about a waist of the runner, a left binding attachable about a left arm of the runner, a left connector attached between a left side of the waist belt and the left binding, a right binding attachable about a right arm of the runner, and a right connector attached between a right side of the waist belt and the right binding. A left elastic strap is attached to the left binding and a right elastic strap is attached to the right binding for engagement by the left hand and the right hand of the runner respectively to maintain the arms at an approximate 90 degree angle.

20 Claims, 10 Drawing Sheets

(56) References Cited

U.S. PATENT DOCUMENTS

2014/0171276 A1    6/2014  Strachan
2015/0040440 A1\*  2/2015  Tozzi ...................... A43B 5/02
                                                          36/77 R \* cited by examiner

RUNNING FORM AID SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a running aid and more specifically it relates to a running form aid system for efficiently teaching a runner the proper running form.

Description of the Related Art

Any discussion of the related art throughout the specification should in no way be considered as an admission that such related art is widely known or forms part of common general knowledge in the field.

During running, it is preferable that runners have their upper arm and forearm at approximately 90 degrees with respect to one another at all times during the running movement. Furthermore, it is preferable that the arms of runners move forward and back instead of across the body with the elbows bent at 90 degrees. Unfortunately, runners often times run with their arms crossing the front of their body. In addition, runners often times incorrectly have their elbows extended significantly further than 90 degrees during the running motion (e.g. hanging down at their sides during running). Crossing the arms in front of the body and/or running with the elbows significantly greater than 90 degrees results in inefficient arm movements during running.

It is further preferable that the forward extending foot of runners enter the dorsiflexion position. The dorsiflexion position involves bringing the top part of the foot (a.k.a. dorsum) up toward the shin of the runner which shortens the distance between the toes and the ankle along with contracting the shin muscles. Using the dorsiflexion position, a shorter and more efficient pendulum swing for the legs is created, the foot is better aligned to absorb the shock of landing and the muscles are tensed to help spring the runner forward into the next stride. Unfortunately, runners often times incorrectly position their foot with respect to their shin during running without entering the dorsiflexion position resulting in an inefficient leg movement and lost speed.

BRIEF SUMMARY OF THE INVENTION

Provided herein is a running form aid system which includes a waist belt attachable about a waist of the runner, a left binding attachable about a left arm of the runner, a left connector attached between a left side of the waist belt and the left binding, a right binding attachable about a right arm of the runner, and a right connector attached between a right side of the waist belt and the right binding. A left elastic strap is attached to the left binding and a right elastic strap is attached to the right binding for engagement by the left hand and the right hand of the runner respectively to maintain the arms at an approximate 90 degree angle.

There has thus been outlined, rather broadly, some of the features of the invention in order that the detailed description thereof may be better understood, and in order that the present contribution to the art may be better appreciated.

There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
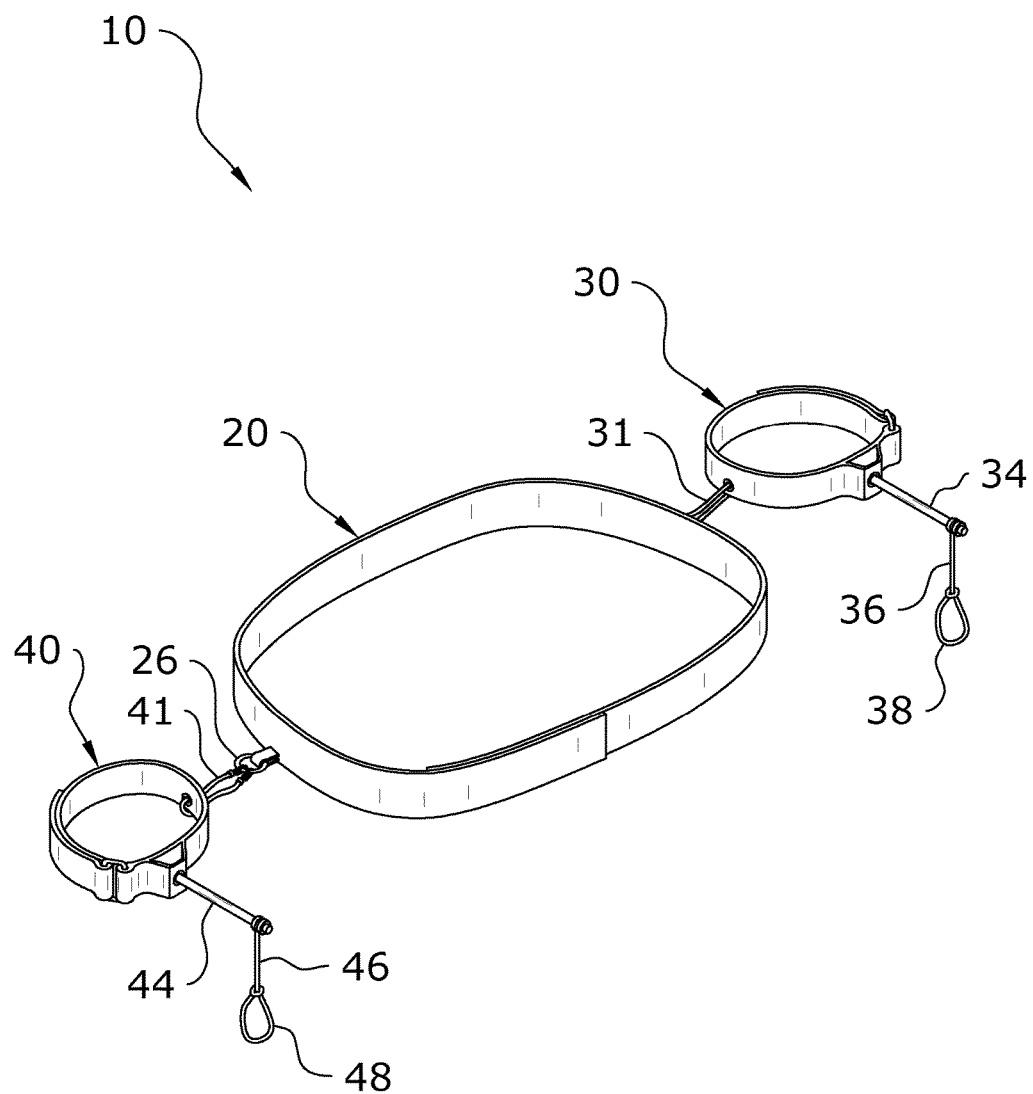
FIG. 1 is a perspective view of one embodiment of a running form aid apparatus.

Turning now descriptively to the drawings, in which similar reference characters denote similar elements throughout the several views, FIGS. 1 through 8c illustrate a running form aid system 10, which comprises a waist belt 20 attachable about a waist of the runner 12, a left binding 30 attachable about a left arm of the runner 12, a left connector 31 attached between a left side of the waist belt 20 and the left binding 30, a right binding 40 attachable about a right arm of the runner 12, and a right connector 41 attached between a right side of the waist belt 20 and the right binding 40. A left elastic strap is attached to the left binding 30 and a right elastic strap is attached to the right binding 40 for engagement by the left hand and the right hand of the runner 12 respectively to maintain the arms at an approximate 90 degree angle. The present invention may be used for training individuals for running (e.g. sprinting, speed walking, jogging, marathon running, etc.) or other types of exercises that involve running. The term "elastic strap" includes all variations of the term that would be known by one of ordinary skill in the art including "elastic cord". In addition, one or more resistance straps (e.g. elastic straps) may be attached to the waist belt 20 and used by a coach to provide rearwardly horizontal resistance to the runner 12 during training.

B. Waist Belt

FIGS. 1 through 5 illustrate an exemplary waist belt 20 adapted to be attachable about a waist of the torso 14 of the runner 12. FIGS. 3, 4 and 7 through 8c illustrate the waist belt 20 attached about the waist of the runner 12. The waist belt 20 may be comprised of various types of materials, including elastic material and non-elastic material. The thickness, length and width of the waist belt 20 may vary depending upon the type of runner 12 using the running form aid system 10.

Figure 2:
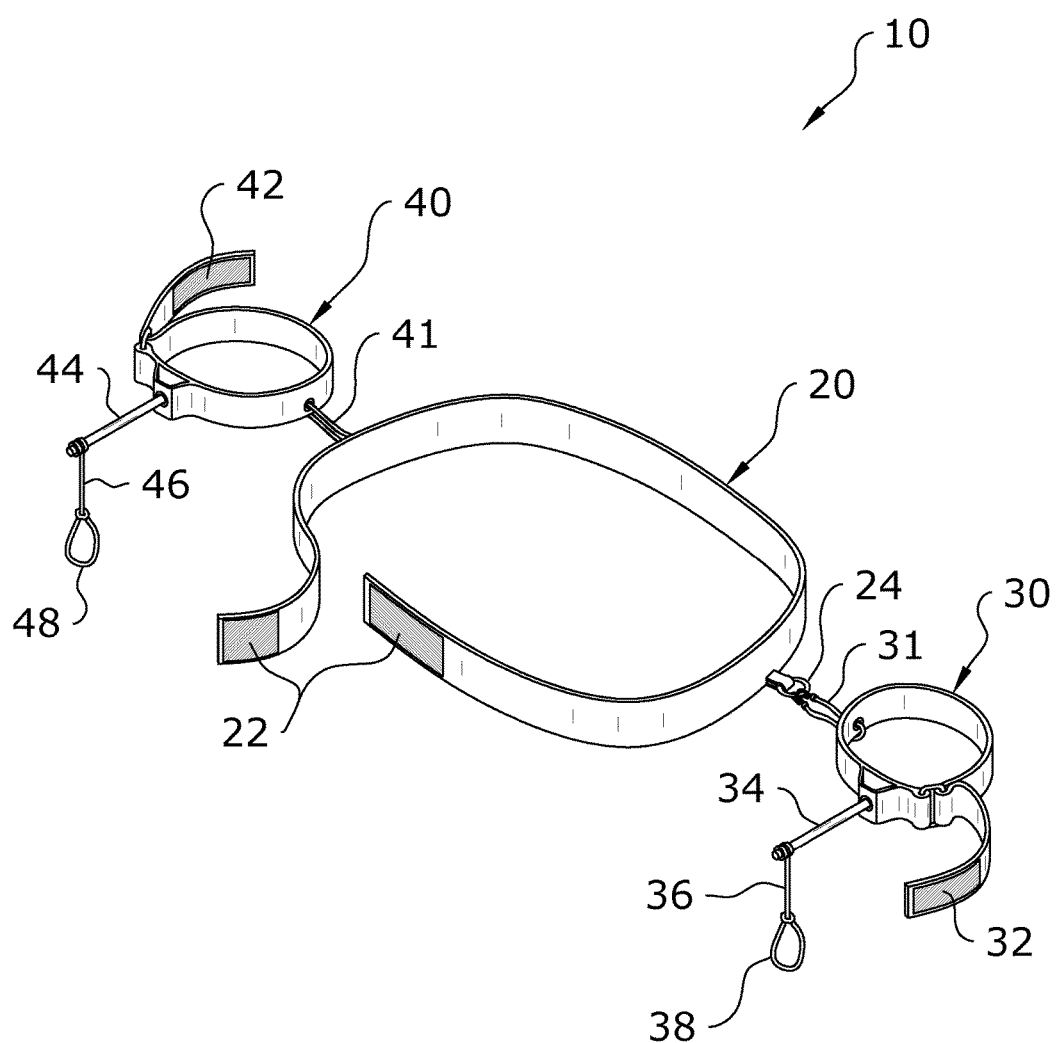
FIG. 2 is a perspective view of the running form aid apparatus of FIG. 1 with the straps disconnected.

The waist belt 20 may be a solid loop structure without any distal ends. Alternatively, the waist belt 20 may have two opposing distal ends that each includes a belt fastener 22 (e.g. hook and loop fastener, snap fasteners, a belt buckle) for removably connecting to one another as illustrated in FIG. 2 of the drawings. The belt fastener 22 attached to each end of the waist belt 20 preferably allows for adjustment of the overall length of the waist belt 20 to provide for a snug fit about the waist of the runner 12.

C. Left and Right Bindings

Figure 3:
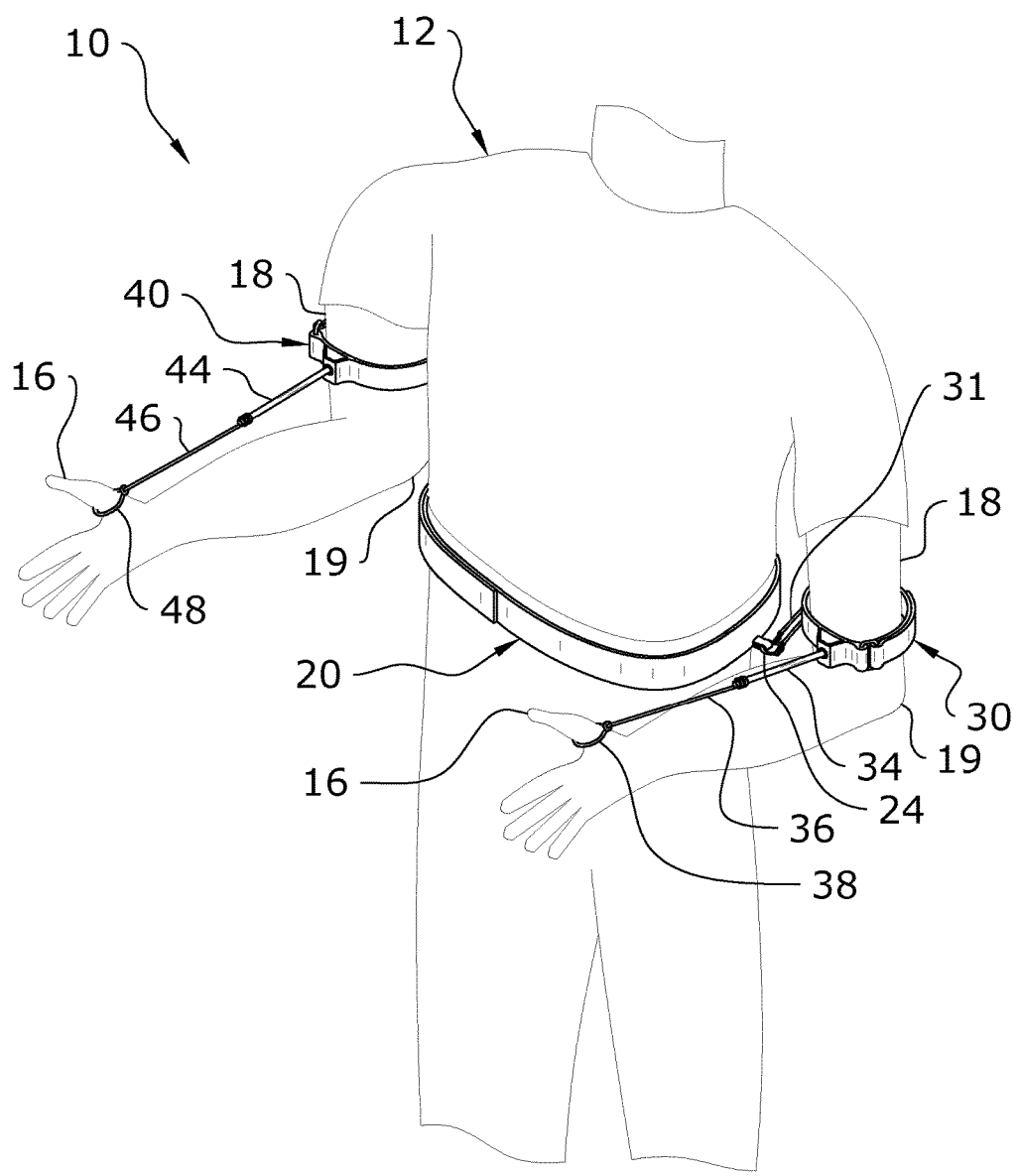
FIG. 3 is a perspective view of the running form aid apparatus attached to a runner.
Figure 4:
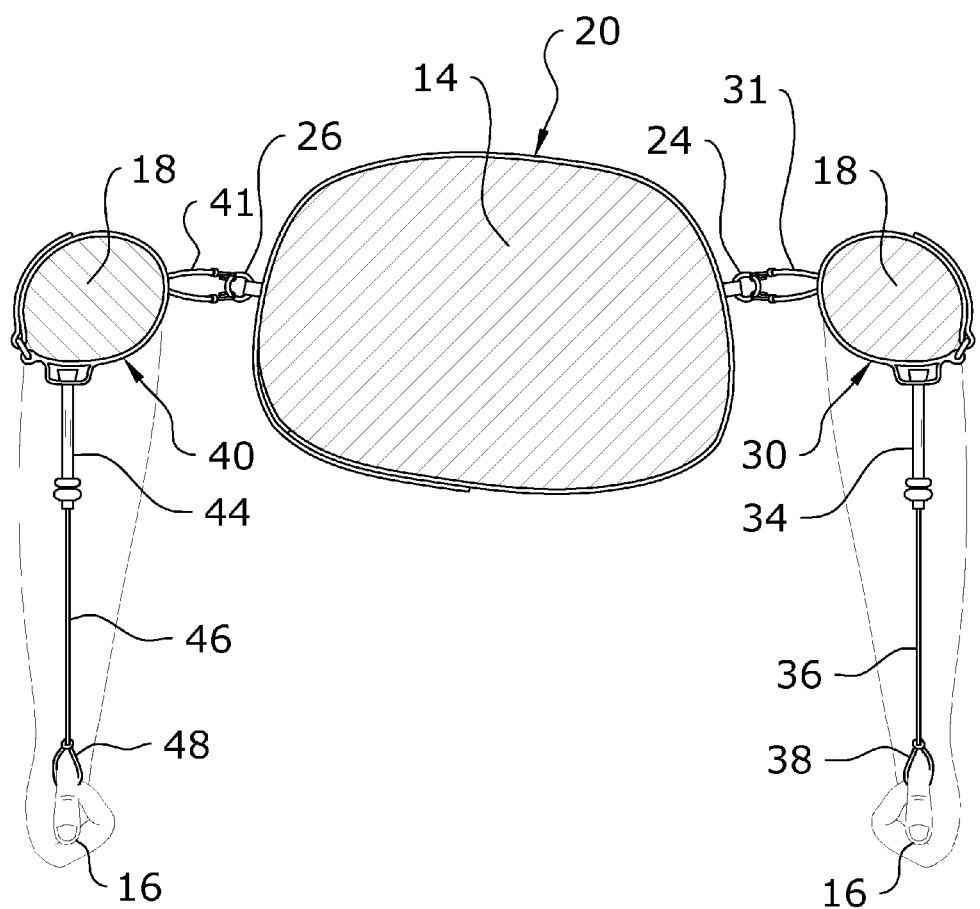
FIG. 4 is a cross sectional view of the running form aid apparatus attached to a runner.

FIGS. 1 through 5 illustrate a left binding 30 attachable about a left arm of the runner 12 and a right binding 40 attachable about the right arm of the runner 12. The left binding 30 and the right binding 40 may be comprised of various types of materials such as, but not limited to, elastic materials and non-elastic materials. The left binding 30 and the right binding 40 may also be a closed loop or they may have opposing distal ends with respective fasteners 32, 42 for providing snug attachment about the arm of the runner 12 as shown in FIGS. 2 through 4 of the drawings. The left binding 30 and the right binding 40 are sized to comfortably attach to the lower portion of the respective upper arm 18 of runner 12 near the respective elbow 19. In particular, the left binding 30 is adapted to be attached to a lower portion of the upper arm 18 of the left arm near the left elbow 19 and the right binding 40 is adapted to be attached to a lower portion of the upper arm 18 of the right arm near the right elbow 19.

Figure 7:
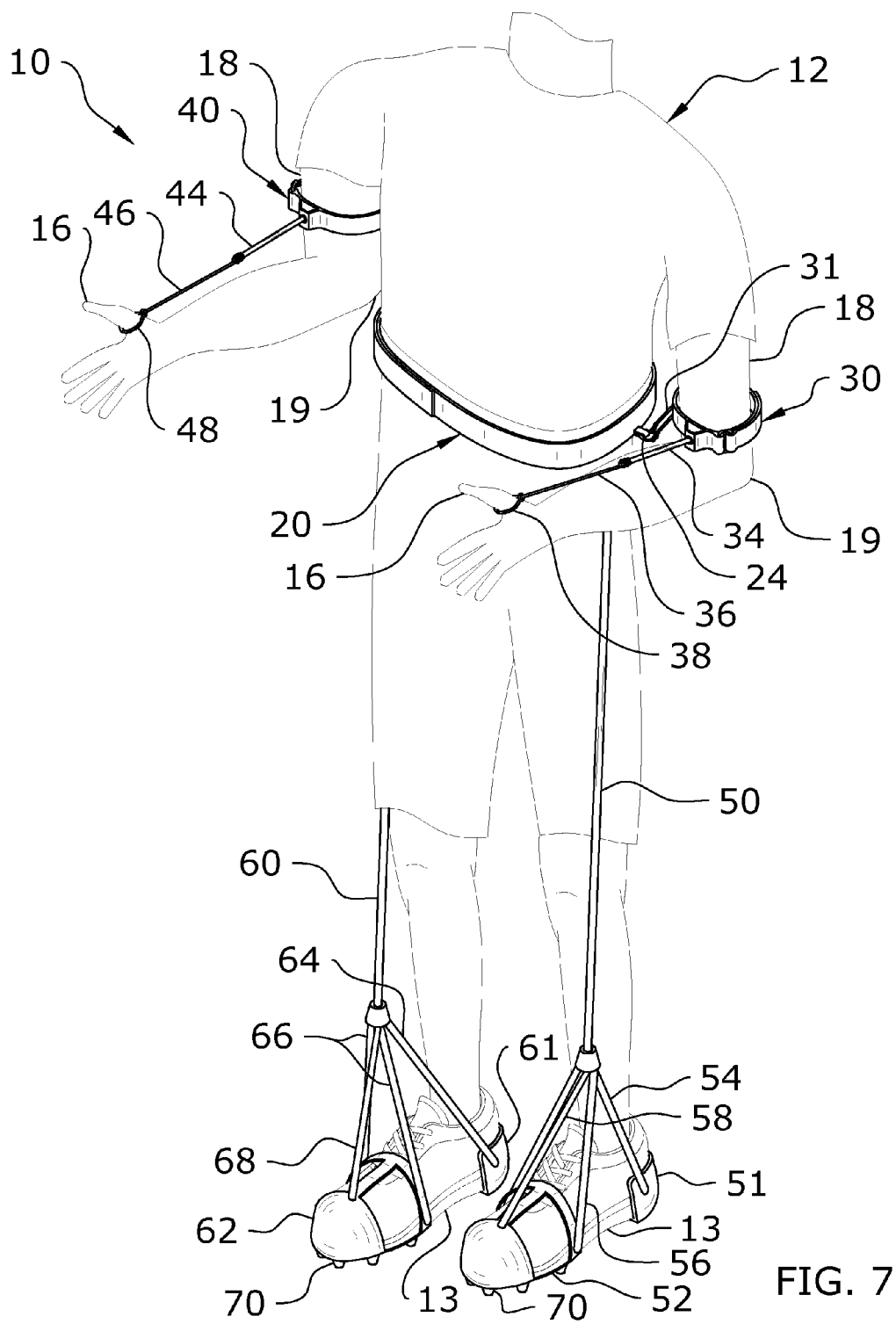
FIG. 7 is a perspective view of the running form aid apparatus of FIG. 5 attached to a runner.
Figure 8A:
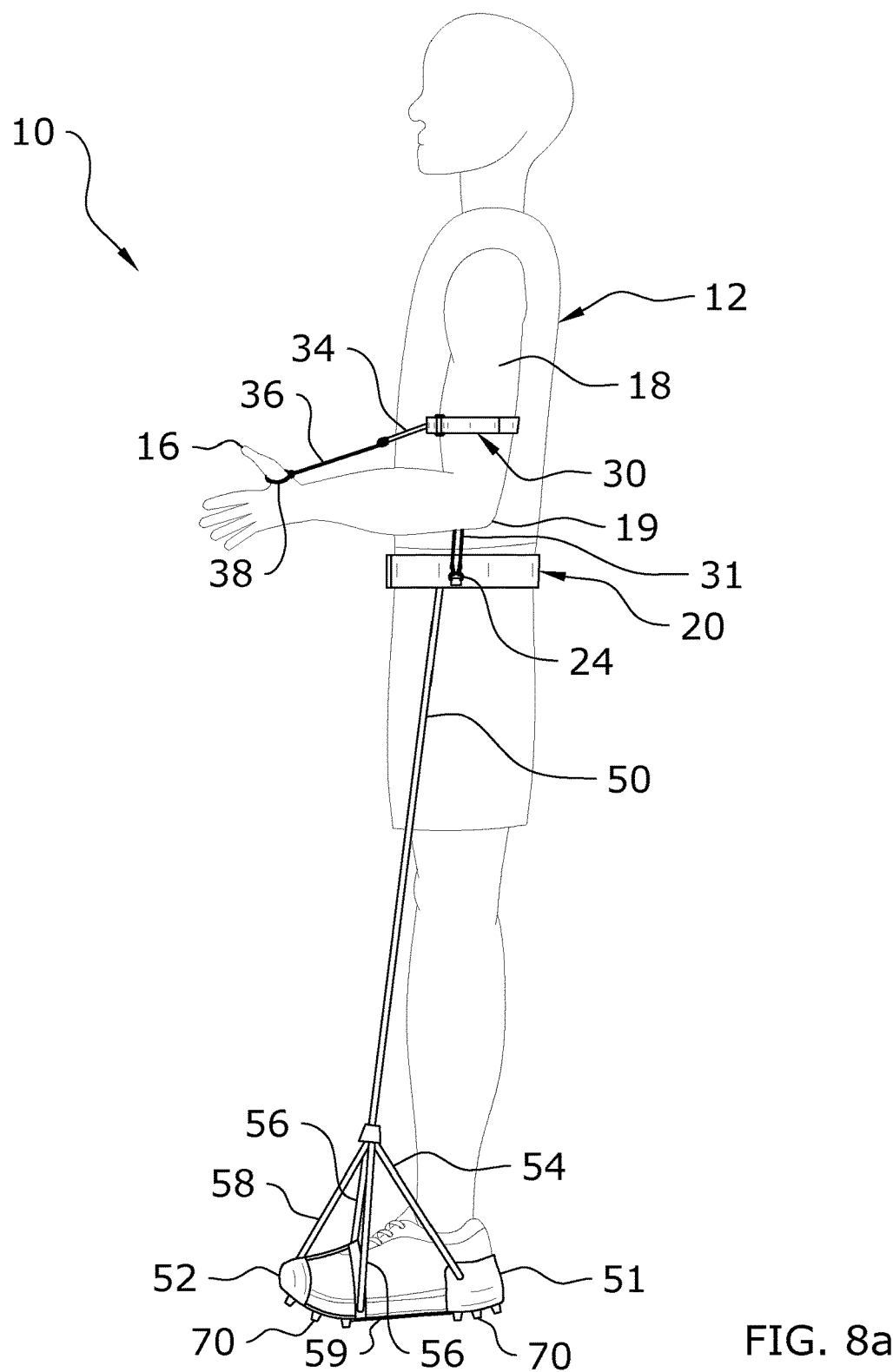
FIG. 8a is a side view of the running form aid apparatus of FIG. 5 attached to a runner in a first position.
Figure 8B:
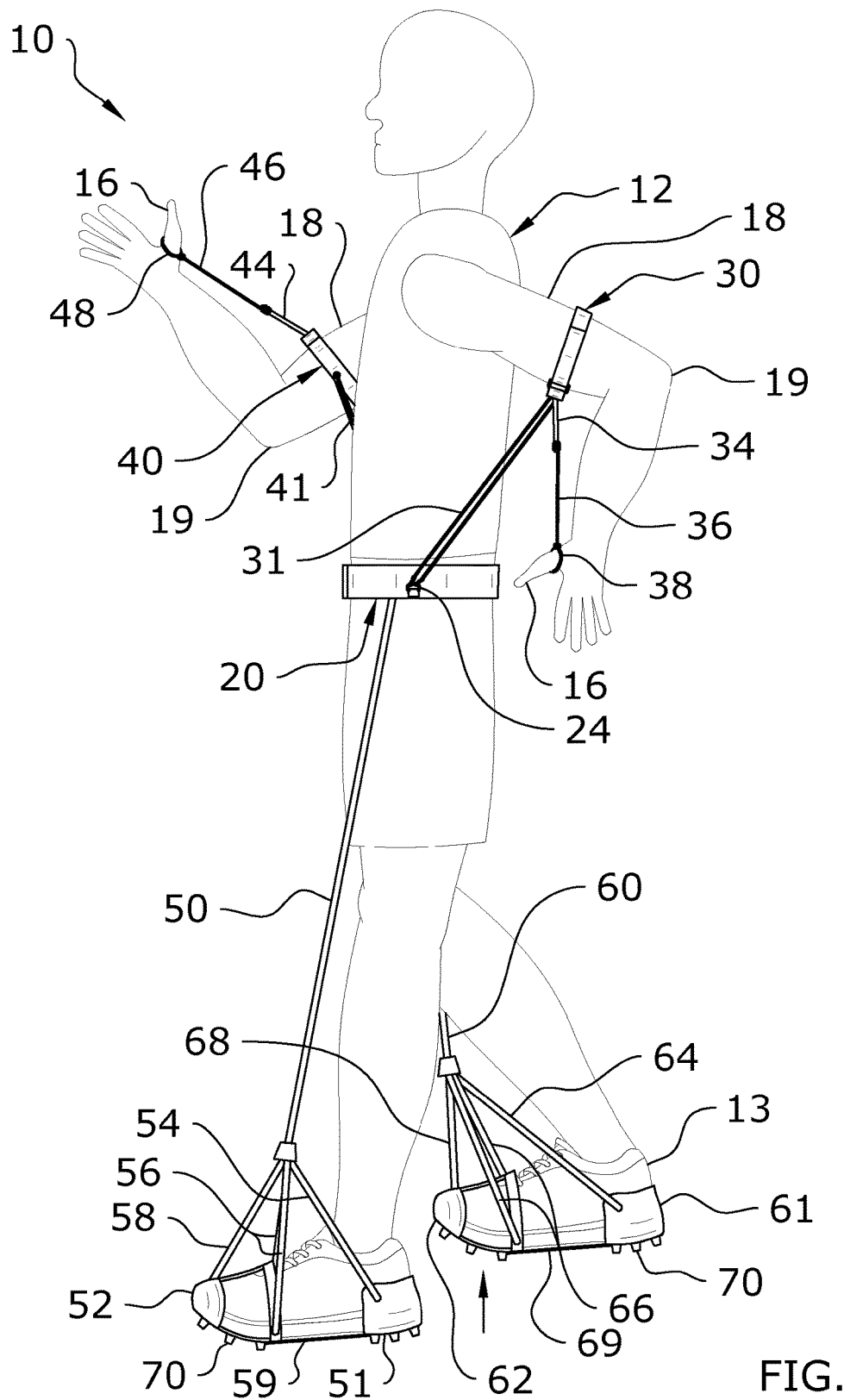
FIG. 8b is a side view of the running form aid apparatus of FIG. 5 attached to a runner in a second position.
Figure 8C:
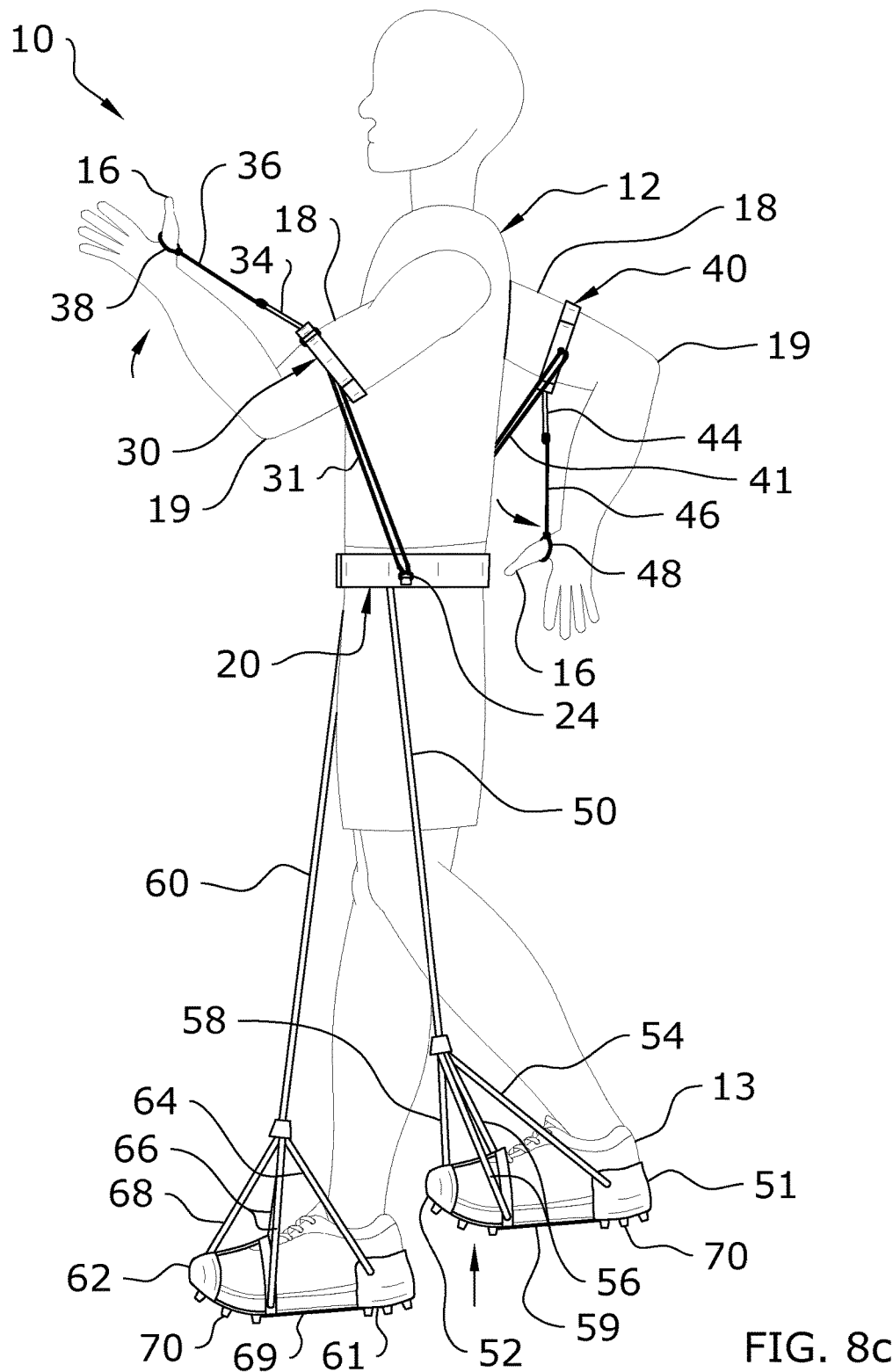
FIG. 8c is a side view of the running form aid apparatus of FIG. 5 attached to a runner in a third position.

A left connector 31 is attached between a left side of the waist belt 20 and the left binding 30 as illustrated in FIGS. 1 through 5. A right connector 41 is attached between a right side of the waist belt 20 and the right binding 40 as further illustrated in FIGS. 1 through 5. The right connector 41 is preferably connected directly opposite of the left connector 31 on the waist belt 20 as illustrated in FIG. 4 of the drawings, however, various other locations of attachment on the waist belt 20 may be used. The left connector 31 and the right connector 41 are preferably comprised of an elastic material to stretch when the runner 12 moves their arms forwardly or rearwardly as illustrated in FIGS. 8a through 8c of the drawings. The left connector 31 and the right connector 41 are preferably loose and not in tension when the upper arms 18 of the runner 12 are vertically orientated as illustrated in FIGS. 3, 7 and 8a of the drawings.

FIGS. 1 through 4 illustrate a left eyelet 24 attached to the left side of the waist belt 20 and a right eyelet 26 attached to the right side of the waist belt 20, wherein the left connector 31 is attached to the left eyelet 24 and the right connector 41 is attached to the right eyelet 26. However, the left connector 31 and the right connector 41 may be directly attached to the waist belt 20 without the usage of eyelets.

D. Left and Right Elastic Straps

Figure 5:
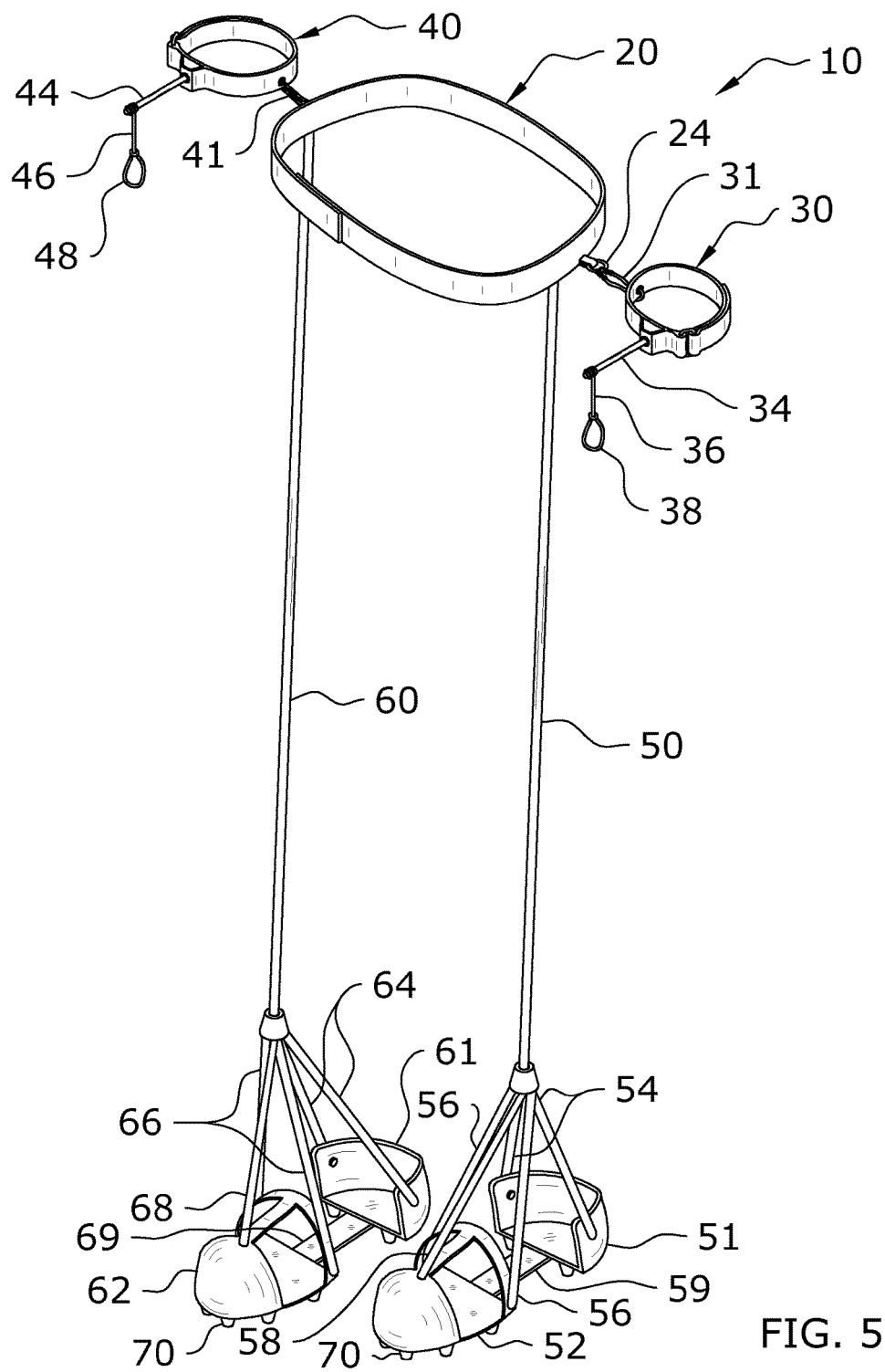
FIG. 5 is a perspective view of another embodiment of the running form aid apparatus to assist in training both the arms and the feet during running.
Figure 6:
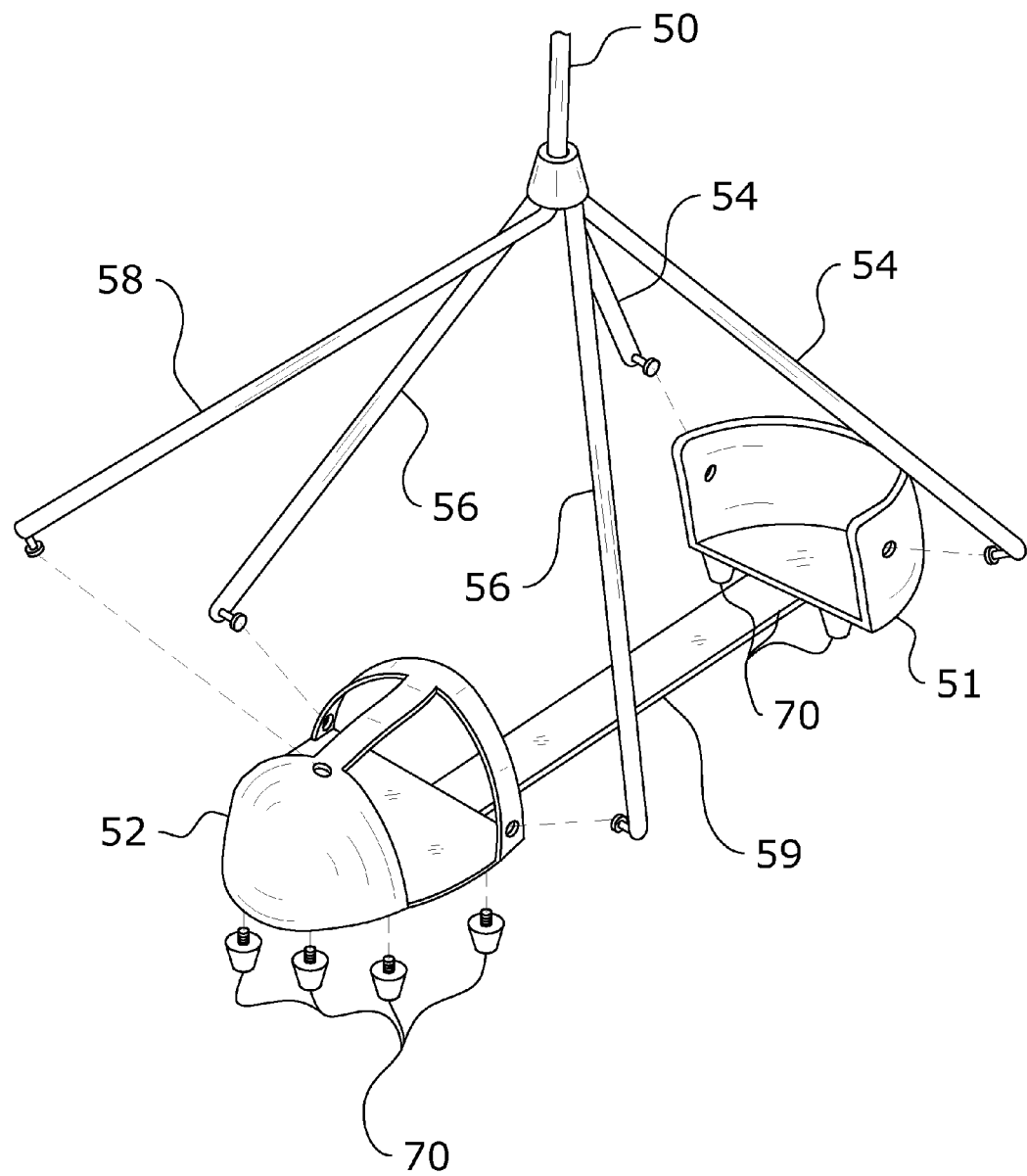
FIG. 6 is a magnified exploded view of a shoe attachment.

A left elastic strap is attached to the left binding 30 and a right elastic strap is attached to the right binding 40 as illustrated in FIGS. 1 through 5 of the drawings. The left elastic strap and the right elastic strap extend generally forwardly from the left binding 30 and right binding 40 respectively as best illustrated in FIGS. 4 and 5 of the drawings. As illustrated in FIG. 4, the left elastic strap may be attached to the left binding 30 approximately ninety-degrees with respect to the attachment location of the left connector 31, and the right elastic strap may be attached to the right binding 40 approximately ninety-degrees with respect to the attachment location of the right connector 41 so as to extend substantially forwardly towards the respective hands of the runner 12 as illustrated in FIGS. 1 through 5 of the drawings.

The left elastic strap is adapted to be engaged by a left hand of the runner 12 and the right elastic strap is adapted to be engaged by a right hand of the runner 12 to assist in maintaining the left arm and the right arm of the runner 12 at approximately a ninety-degree angle at the respective elbows 19. The left elastic strap and the right elastic strap are both comprised of an elastic material wherein both the left elastic strap and the right elastic strap have a relatively consistent resistance based on the length stretched by the runner 12.

The left elastic strap preferably includes a left loop 38 opposite of the left binding 30 adapted for removably receiving a left thumb 16 of the runner 12 and the right elastic strap preferably includes a right loop 48 opposite of the right binding 40 adapted for removing receiving a right thumb 16 of the runner 12. Alternatively, connectors may be used to connect the hands of the runner 12, but the usage of loops for attaching to the thumbs 16 is preferable which causes the hands to become substantially vertically aligned during running as illustrated in FIGS. 7 through 8c of the drawings.

As illustrated in FIGS. 1 through 5, the left elastic strap may be comprised of a left inner strap 34 attached to the left binding 30 and a left outer strap 36 attached to the left inner strap 34. Similarly, the right elastic strap may be comprised of a right inner strap 44 attached to the right binding 40 and a right outer strap 46 attached to the right inner strap 44. A single elastic strap may alternatively be used to construct the left and right elastic straps. The left inner strap 34 and the right inner strap 44 may have a greater resistance than the left outer strap 36 and the right outer strap 46 respectively to provide increased resistance at the inner portion thereof compared to the outer portion thereof. The left inner strap 34 and the right inner strap 44 may have a greater width than the left outer strap 36 and the right outer strap 46 to provide the increased resistance.

E. Left and Right Shoe Attachments

FIGS. 5 through 8c illustrate an alternative embodiment that utilizes shoe attachments with corresponding straps 50, 60 to connect the feet 13 of the runner 12 with the waist belt 20 to assist in pulling upwardly on the front portion of the feet 13 during running to encourage the dorsiflexion position for the feet 13. The shoe attachments may be comprised of a single structure or a multiple component structure.

The left shoe attachment is adapted for attaching to a left shoe of the runner 12. A left main strap 50 comprised of an elastic material (e.g. elastic strap) is attached between the waist belt 20 and the left shoe attachment. The left main strap 50 is removably attached to the left side of the waist belt 20 by a connector clip and may be removably connected directly to the waist belt 20 or to the left eyelet 24. The left main strap 50 is attached to a front portion of the left shoe attachment to provide an increased lifting force to the front portion of the left shoe of the runner 12 thereby aligning and encouraging the dorsiflexion position for the left foot during running.

The left main strap 50 may include a plurality of lower connector straps attached to the left shoe attachment. The lower connector straps of the left main strap 50 are preferably comprised of an elastic material also. It is preferable that an increased number of the lower connector straps are attached to the front portion of the left shoe attachment than to the rear portion to provide the increased lifting force to the front portion. The left shoe attachment may be comprised of a rear left support 51 and a front left support 52 that are connected together by an elastic strap 59. The plurality of lower connector straps may be comprised of one or more left rear straps 54 attached to the rear left support 51 along with one or more left side straps 56 and at least one left front strap 58 attached to the front left support 52 as shown in FIG. 7 of the drawings. The lower connector straps may be attached with removable flanged end members that removably extend through apertures within the left shoe attachment. The left shoe attachment further includes a plurality of detachable cleats 70 to allow for various types of materials to be used (e.g. rubber, metal) and shapes (e.g. spikes, rounded cleats 70). The shoe attachments and cleats may be comprised of any structure similar to a conventional athletic shoe (e.g. track shoe, football shoe, basketball shoe, cross country running shoe, marathon shoe, etc.). It can be appreciated that the entire bottom sole or portions of the sole (e.g. rear portion) of the shoe attachments may have no cleats.

The right shoe attachment is similar to the left shoe attachment and is adapted for attaching to a right shoe of the runner 12 as illustrated in FIG. 7 of the drawings. A right main strap 60 comprised of an elastic material (e.g. elastic strap) is attached between the waist belt 20 and the right shoe attachment. The right main strap 60 is removably attached to the right side of the waist belt 20 by a connector clip and may be removably connected directly to the waist belt 20 or to the right eyelet 26. The right main strap 60 is attached to a front portion of the right shoe attachment to provide an increased lifting force to the front portion of the right shoe of the runner 12 thereby aligning and encouraging the dorsiflexion position for the right foot during running.

The right main strap 60 may include a plurality of lower connector straps attached to the right shoe attachment. The lower connector straps of the right main strap 60 are preferably comprised of an elastic material also. It is preferable that an increased number of the lower connector straps are attached to the front portion of the right shoe attachment than to the rear portion to provide the increased lifting force to the front portion. The right shoe attachment may be comprised of a rear right support 61 and a front right support 62 that are connected together by an elastic strap 69. The plurality of lower connector straps may be comprised of one or more right rear straps 64 attached to the rear right support 61 along with one or more right side straps 66 and at least one right front strap 68 attached to the front right support 62 as shown in FIG. 7 of the drawings. The lower connector straps may be attached with removable flanged end members that removably extend through apertures within the right shoe attachment. The right shoe attachment further includes a plurality of detachable cleats 70 to allow for various types of materials to be used (e.g. rubber, metal) and shapes (e.g. spikes, rounded cleats 70).

F. Operation of Preferred Embodiment

In use, the runner 12 being trained attaches the waist belt 20 about their waist as illustrated in FIGS. 3, 4 and 7 through 8c of the drawings. The runner 12 then attaches the left binding 30 to the lower portion of the upper arm 18 of the left arm and the right binding 40 to the lower portion of the upper arm 18 of the right arm as shown in FIG. 3. The runner 12 then extends their left thumb 16 through the left loop 38 and their right thumb 16 through the right loop 48 which extends the left and right elastic straps respectively. If the alternative embodiment is used, the shoe attachments are attached to the shoes (or feet 13) of the runner 12 as illustrated in FIGS. 7 through 8c of the drawings.

The runner 12 then proceeds to run as they normally would run moving their legs and arms forwardly/rearwardly as shown in FIGS. 8b and 8c. The left elastic band and the right elastic band maintain the left arm and the right arm respectively in an approximate ninety-degree position at the elbows 19 during all phases of the running movement thereby training the runner 12 as to the benefit of keeping their arms in the proper position as shown in FIGS. 7 through 8c of the drawings. The elastic straps further prevent the runner 12 from crossing their arms in front of their bodies to ensure that the arms are substantially parallel to one another during all phases of the running movement. With the alternative embodiment, the shoe attachments maintain the feet 13 in the preferred dorsiflex position to teach the runner 12 the proper position for their feet 13 during running. The runner 12 may use the running form aid system 10 for as long as they need and then may remove the same to run without the running form aid system 10 to confirm that the proper running form is being trained. By using the running form aid system 10 over extended periods of time, the runner 12 is trained to use the proper running form with respect to the arms and the feet 13.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A running form aid system for use by a runner to assist in promoting a correct running form, comprising:
   a waist belt attachable about a waist of the runner;
   a left binding attachable about a left arm of the runner;
   a left connector attached between a left side of the waist belt and the left binding, wherein the left connector is comprised of an elastic material;
   a right binding attachable about a right arm of the runner;

a right connector attached between a right side of the waist belt and the right binding, wherein the right connector is comprised of an elastic material; and a left elastic strap attached to the left binding and a right elastic strap attached to the right binding, wherein the left elastic strap is adapted to be engaged by a left hand of the runner and the right elastic strap is adapted to be engaged by a right hand of the runner to assist in maintaining the left arm and the right arm of the runner at approximately a ninety-degree angle at the respective elbows;

wherein the left binding is adapted to be attached to a lower portion of the upper arm of the left arm near the left elbow and wherein the right binding is adapted to be attached to a lower portion of the upper arm of the right arm near the right elbow.

2. The running form aid system of claim 1, wherein the waist belt has a first end with a first belt fastener and a second end with a second belt fastener, wherein the first belt fastener is removably connected to the second belt fastener.

3. The running form aid system of claim 1, wherein the waist belt is comprised of an elastic material.

4. The running form aid system of claim 1, including a left eyelet attached to the left side of the waist belt and a right eyelet attached to the right side of the waist belt, wherein the left connector is attached to the left eyelet and the right connector is attached to the right eyelet.

5. The running form aid system of claim 1, wherein the left binding includes a left fastener and the right binding includes a right fastener.

6. The running form aid system of claim 1, wherein the left elastic strap includes a left loop opposite of the left binding adapted for removably receiving a left thumb of the runner and the right elastic strap includes a right loop opposite of the right binding adapted for removably receiving a right thumb of the runner.

7. The running form aid system of claim 1, wherein the left elastic strap is comprised of a left inner strap attached to the left binding and a left outer strap attached to the left inner strap, and wherein the right elastic strap is comprised of a right inner strap attached to the right binding and a right outer strap attached to the right inner strap.

8. The running form aid system of claim 7, wherein the left inner strap and the right inner strap have a greater resistance than the left outer strap and the right outer strap.

9. The running form aid system of claim 8, wherein the left inner strap and the right inner strap have a greater width than the left outer strap and the right outer strap.

10. The running form aid system of claim 1, wherein the left elastic strap is attached to the left binding approximately ninety-degrees with respect to the attachment location of the left connector, and wherein the right elastic strap is attached to the right binding approximately ninety-degrees with respect to the attachment location of the right connector.

11. The running form aid system of claim 1, wherein the left connector is attached to the waist belt opposite of the right connector.

12. The running form aid system of claim 1, including a left shoe attachment adapted for attaching to a left shoe of the runner, a left main strap attached between the waist belt and the left shoe attachment, a right shoe attachment adapted for attaching to a right shoe of the runner, and a right main strap attached between the waist belt and the right shoe attachment, wherein the left main strap and the right main strap are each comprised of an elastic material.

13. The running form aid system of claim 12, wherein the left main strap is attached to a front portion of the left shoe attachment and wherein the right main strap is attached to a front portion of the right shoe attachment.

14. The running form aid system of claim 13, wherein the left main strap applies a lifting force to the front portion of the left shoe attachment to align the left foot of the runner into dorsiflexion position and the right main strap applies a lifting force to the front portion of the right shoe attachment to align the right foot of the runner into the dorsiflexion position.

15. The running form aid system of claim 12, wherein the left main strap and the right main strap each includes a plurality of lower connector straps that are attached to the left shoe attachment and the right shoe attachment respectively.

16. The running form aid system of claim 15, wherein the left shoe attachment is comprised of a rear left support and a front left support, and wherein the right shoe attachment is comprised of a rear right support and a front right support.

17. The running form aid system of claim 16, wherein the front left support and the front right support each include more of the plurality of connector straps attached than the rear left support and the rear right support.

18. The running form aid system of claim 12, wherein the left shoe attachment and the right shoe attachment each include a plurality of detachable cleats.

19. A running form aid system for use by a runner to assist in promoting a correct running form, comprising:
    a waist belt attachable about a waist of the runner;
    a left binding attachable about a left arm of the runner;
    a left connector attached between a left side of the waist belt and the left binding, wherein the left connector is comprised of an elastic material;
    a right binding attachable about a right arm of the runner;
    a right connector attached between a right side of the waist belt and the right binding, wherein the right connector is comprised of an elastic material; and
    a left elastic strap attached to the left binding and a right elastic strap attached to the right binding, wherein the left elastic strap is adapted to be engaged by a left hand of the runner and the right elastic strap is adapted to be engaged by a right hand of the runner to assist in maintaining the left arm and the right arm of the runner at approximately a ninety-degree angle at the respective elbows;
    wherein the left elastic strap is comprised of a left inner strap attached to the left binding and a left outer strap attached to the left inner strap, and wherein the right elastic strap is comprised of a right inner strap attached to the right binding and a right outer strap attached to the right inner strap.

20. A running form aid system for use by a runner to assist in promoting a correct running form, comprising:
    a waist belt attachable about a waist of the runner;
    a left binding attachable about a left arm of the runner;
    a left connector attached between a left side of the waist belt and the left binding, wherein the left connector is comprised of an elastic material;
    a right binding attachable about a right arm of the runner;
    a right connector attached between a right side of the waist belt and the right binding, wherein the right connector is comprised of an elastic material; and
    a left shoe attachment adapted for attaching to a left shoe of the runner, a left main strap attached between the waist belt and the left shoe attachment, a right shoe attachment adapted for attaching to a right shoe of the runner, and a right main strap attached between the waist belt and the right shoe attachment, wherein the left main strap and the right main strap are each comprised of an elastic material;

wherein the left main strap and the right main strap each includes a plurality of lower connector straps that are attached to the left shoe attachment and the right shoe attachment respectively.

* * * * *